(12) United States Patent
Eiselt et al.

(10) Patent No.: US 8,059,965 B2
(45) Date of Patent: *Nov. 15, 2011

(54) POLARIZATION MODE DISPERSION COMPENSATION

(75) Inventors: Michael Herbert Eiselt, Middletown, NJ (US); Jonathan A. Nagel, Brooklyn, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/315,350

(22) Filed: Dec. 2, 2008

(65) Prior Publication Data
US 2009/0087193 A1 Apr. 2, 2009

Related U.S. Application Data

(63) Continuation of application No. 11/906,714, filed on Oct. 3, 2007, now Pat. No. 7,466,923, which is a continuation of application No. 11/712,606, filed on Feb. 28, 2007, now Pat. No. 7,295,781, which is a continuation of application No. 10/820,529, filed on Apr. 8, 2004, now abandoned, which is a continuation of application No. 09/727,954, filed on Dec. 1, 2000, now Pat. No. 6,768,875.

(51) Int. Cl.
*H04B 10/12* (2006.01)

(52) U.S. Cl. .......... 398/147; 398/152; 398/81; 398/158; 398/159; 398/65; 385/11; 385/27; 385/37; 385/1; 359/495; 359/280; 359/281

(58) Field of Classification Search .......... 398/147, 398/148, 158, 159, 152, 149, 65, 79, 205, 398/206, 208, 209, 213, 214, 29, 33; 385/27, 385/37, 1, 11; 359/495, 280, 281
See application file for complete search history.

(56) References Cited

U.S. PATENT DOCUMENTS

| | | | | |
|---|---|---|---|---|
| 6,404,520 B1 * | 6/2002 | Robinson et al. | .......... | 398/9 |
| 6,583,903 B1 * | 6/2003 | Way et al. | .......... | 398/152 |
| 6,768,875 B1 * | 7/2004 | Eiselt et al. | .......... | 398/147 |
| 7,295,781 B1 * | 11/2007 | Eiselt et al. | .......... | 398/147 |
| 7,466,923 B1 * | 12/2008 | Eiselt et al. | .......... | 398/147 |

* cited by examiner

*Primary Examiner* — Hanh Phan

(57) ABSTRACT

Methods and systems for PMD compensation in an optical communication system are implemented by transmitting multiple optical signals through a common optical conduit to an optical compensator that adjustably rotates the polarization states of the multiple optical signals and transmits the rotated optical signals to an optical receiver. The receiver, upon sensing an excessive error condition, commands the optical compensator to change the polarization state of rotation, which changes the PMD profile of the received optical signals.

9 Claims, 7 Drawing Sheets

POLARIZATION MODE DISPERSION COMPENSATION

This non-provisional application is a continuation of U.S. application Ser. No. 11/906,714, filed Oct. 3, 2007 now U.S. Pat. No. 7,466,923, which is a continuation of and claims priority to U.S. application Ser. No. 11/712,606, filed on Feb. 28, 2007, now U.S. Pat. No. 7,295,781, which is a continuation of and claims priority to U.S. application Ser. No. 10/820,529, filed on Apr. 8, 2004, abandoned, which is a continuation of and claims priority to U.S. application Ser. No. 09/727,954, filed on Dec. 1, 2000, now U.S. Pat. No. 6,768,875.

BACKGROUND OF THE INVENTION

1. Field of Invention

The invention relates to methods and systems that compensate for polarization mode dispersion.

2. Description of Related Art

As data rates transmitted over optical fibers increase, the effects of polarization mode dispersion (PMD) become increasingly important. Polarization mode dispersion is a form of signal distortion and can be caused by subtle physical defects in an optical fiber giving rise to birefringence. A birefringent optical fiber conducting a modulated optical signal can temporally disperse the resulting optical frequencies of the optical signal. Furthermore, as environmental variables such as temperature fluctuate over time, the birefringent character of the optical fiber can change, thus changing the dispersion profile of the optical signal. Accordingly, there is a need for new technology to provide better PMD compensation.

SUMMARY OF THE INVENTION

The invention provides methods and systems for PMD compensation for optical communication systems having an optical transmitter, an optical receiver and one or more optical compensators.

As multiple optical signals having different optical frequency bands are transmitted by the transmitter, the optical compensators adjustably alter, or rotate, the polarization states of the optical signals as they traverse the optical compensators. The rotated optical signals are then received by the optical receiver, which can measure error conditions such as bit-error rates of the various optical signals.

If a particular optical signal exhibits an unacceptable error condition, the optical receiver issues commands to the optical compensators to change the polarization rotation angles of the various optical signals traversing the optical compensators. As the optical compensators change the polarization states, the PMD of each optical signal observed at the optical receiver can vary until all optical signals received by the optical receiver display acceptable performance.

Other features and advantage of the present invention are described below are apparent from the accompanying drawings and from the detailed description which follows.

BRIEF DESCRIPTION OF THE DRAWINGS

The invention is described in detail with regard to the following figures, wherein like numbers reference like elements, and wherein:

FIG. 1 is a block diagram of an exemplary optical transmission system;

FIG. 2 is an exemplary representation of changing polarization phase of a polarized optical signal transmitted through an optical conduit;

FIG. 3 is an exemplary diagram of an imperfect optical conduit that can give rise to PMD;

FIG. 4 is a block diagram of an exemplary receiver of the optical transmission system of FIG. 1;

FIG. 5 is a block diagram of a first exemplary compensator of the optical transmission system of FIG. 1;

FIG. 6 is a block diagram of a second exemplary compensator of the optical transmission system of FIG. 1;

FIG. 7 is a block diagram of an exemplary second optical transmission system using the receiver and compensators of FIGS. 4-6; and FIG. 8 is a flowchart outlining an exemplary operation of a process for compensating for PMD.

DETAILED DESCRIPTION OF PREFERRED EMBODIMENTS

As an optical carrier of a given wavelength is modulated according to a particular scheme, the resulting optical signal can be characterized as a narrow spectrum of frequencies centered on the carrier wavelength. For example, an optical carrier having a wavelength of 880 nm (nanometers) can be modulated by pulse code modulation (PCM) technique to produce an optical signal having a spectrum of 880±12 nm. As such optical signals are transported by birefringent optical fibers, the optical fibers can distort the optical signals according to a number of different types of polarization mode dispersion (PMD), including first- and higher-order PMD.

First-order PMD refers to the time dispersal of various polarization components of an optical signal that is essentially constant for all frequencies in a narrow band of optical frequencies. That is, for a high-speed data signal modulated on an optical carrier, the resulting band of optical frequencies will be dispersed in a uniform manner independent of frequency, i.e., multiple images, or echoes, of a transmitted optical signal can appear at a receiver. Higher-order PMD refers to temporal dispersal that, unlike first-order PMD, varies as a function of frequency, i.e., components of an optical signal having a particular frequency can be delayed relative to the rest of the optical signal.

As various techniques are developed to transport increasing numbers of optical signals having different wavelengths through a single optical fiber, it should be appreciated that each optical signal is subject to PMD. While optical transmission systems are generally designed to exhibit minimal PMD, these systems can slowly deteriorate with time or otherwise change. Once a channel deteriorates, it can stay in a non-functional state for a times between several minutes and several hours.

For an optical fiber carrying multiple optical signals centered around different optical frequencies, it should be appreciated that the PMD profile for a particular optical signal can appear quite different from any other PMD profile, despite the fact that each optical signal traverses the same birefringent medium. It should be further appreciated that, as the birefringence of the optical fiber changes due to factors such as fluctuations of temperature and humidity, the PMD profiles for the various optical signals can change in apparently independent and disparate fashions.

While the effects of PMD can be reduced for a single optical signal by re-aligning the optical signal's components to counter the optical signal's particular PMD profile, these techniques do not address simultaneously compensating for multiple optical signals having disparate PMD profiles. However, by placing very simple optical hardware such as one or more optical polarization phase controlling devices at sufficiently distant locations from an optical receiver, PMD can be simultaneously controlled for a large number of optical signals.

For example, for a given optical transmission system having a transmitter and a receiver connected by a birefringent optical fiber, changing the polarization state of an optical signal at the transmitter will cause a change in the PMD profile for each optical signal at the receiver. By dividing the optical fiber into two comparable lengths separated by an optical compensator, the polarization state of the optical signals can be manipulated by the compensator such that the PMD produced by the latter length of optical fiber can correct for the PMD produced by the first length of optical fiber.

It should be appreciated that, by changing the PMD profile of a particular optical signal in such systems using an optical compensator, the deterioration of the optical signal can be reversed within seconds with a high probability, while the probability that the other optical signals using the same optical fiber will be negatively impacted is very low. Accordingly, system downtime can be lowered.

Figure 1:
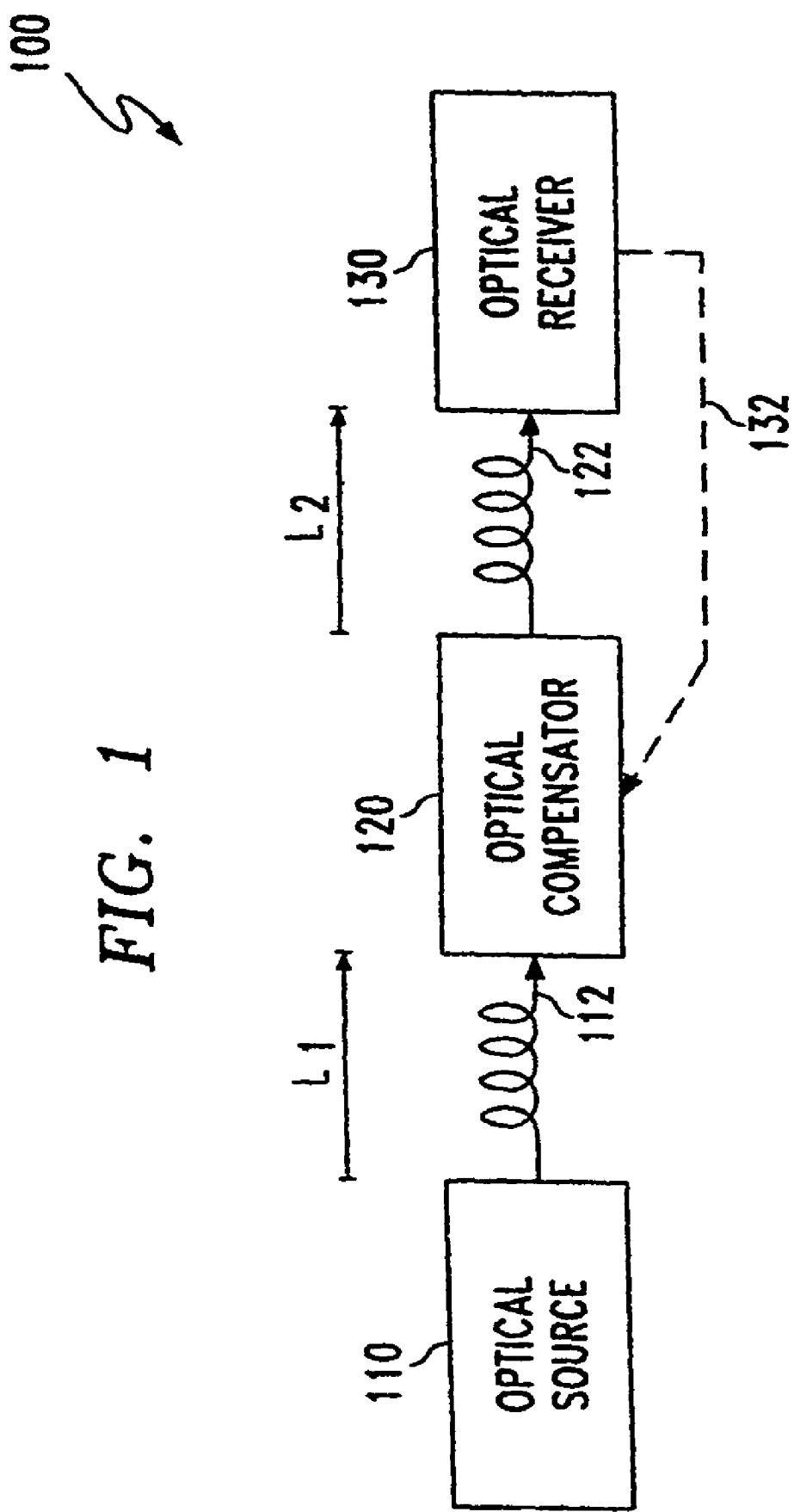

FIG. 1 shows an exemplary block diagram of an optical transmission system 100. The system 100 includes an optical source 110, an optical compensator 120 and an optical receiver 130. The optical compensator 120 can receive optical signals from the optical source 110 via conduit 112, rotate the polarization states of the optical signals, then provide the rotated optical signals to the optical receiver 130 via conduit 122. The optical receiver 130 can also send commands, error conditions or other information to the optical compensator 120 using the link 132 to change the polarization states of rotation of the optical signals, thus adjusting for PMD.

The optical source 110 and the optical receiver 130 can be any one of a number of different types of optical sources and receiving devices, such as computers with optical transceivers or any known or later developed combination of software and hardware capable of generating/receiving, relaying or recalling from storage any information capable of being transmitted/received in an optical signal.

In various exemplary embodiments, the optical receiver 130 also measures an error condition such as the total number of bit-errors counted in a received optical signal. For example, bit-errors can be measured and stored according to the synchronous optical network (SONET) standard, according to a predetermined forward error correction (FEC) technique or according to any other known or later developed technique capable of measuring bit-errors in a received optical signal. In other various exemplary embodiments, the optical receiver 130 can directly measure PMD of individual optical signals using a linear optical transducer, high-speed analog-to-digital converter and other electronics. However, it should be appreciated that any known or later developed technique capable of directly or indirectly measuring PMD alone or in combination with techniques directed to measuring bit-errors alternatively can be used.

In various exemplary embodiments, the optical compensator 120 and optical receiver 130 are positioned at a distance such that changing the polarization states of optical signals as observed at the optical compensator 120 can substantially affect the PMD profiles of the optical signals at the optical receiver 130. It should be appreciated that the longer the length of birefringent optical conduit between the optical compensator 120 and the optical receiver 130, the greater the possible effect the optical compensator 120 can produce. For example, in a communication system having a length of optical conduit, if the optical compensator 120 is placed very close to the optical receiver 130, the optical compensator 120 can produce little, if any, compensation. However, as the optical compensator 120 is moved away from the optical receiver 130, the possible corrective effects can increase.

The effects that the optical compensator 120 can have on a particular optical signal will be a function of several variables such as the birefringent nature of the optical conduit and the wavelength of the optical signal. For example, if an optical conduit has no birefringence, the optical conduit will produce no PMD whatsoever despite the polarization state at the optical compensator 120.

However, if the optical conduit has a single defect along its length, it can produce only first-order PMD and any polarization state change at the optical compensator 120 can cause a change in the first-order PMD profile at the optical receiver 130. If the optical conduit has multiple defects along its length, it can produce both first- and higher-order PMD, and any polarization state change at the optical compensator 120 can subsequently affect all orders in a PMD profile at the optical receiver 130. It should be appreciated that the severity of PMD produced by any optical conduit will be a function of the number, type and severity of the defects of the optical conduit, which can be difficult to determine empirically. Accordingly, birefringence of an optical conduit, including the birefringent drift due to changing environmental factors, must generally be determined experimentally.

In addition to the birefringence of an optical conduit, the wavelength $\lambda$ of the optical signal will affect PMD. For example, a first optical signal having a wavelength $\lambda_1$ can have a PMD profile that appears totally independent and uncorrelated to a second optical signal having a second wavelength $\lambda_2$, even though both optical signals traverse the same optical conduit.

Given that the particular PMD profile produced by a given length of conduit and observed at an optical receiver can be controlled by varying the polarization state at an optical compensator, the PMD profile for any optical signal by any length L of optical conduit can be expressed by equation (1):

$$\text{PMD Profile} = \Psi_{(L,\lambda)}(\phi_\lambda) \quad (1)$$

where $\Psi$ is a complex function describing a PMD Profile and $\phi_\lambda$ is the polarization state of an optical signal produced by an optical source or compensator at the source boundary of the optical conduit and having a wavelength $\lambda$.

As discussed above, the optical compensator 120 should be positioned at a sufficient distance from the optical receiver 130 such that a change in the polarization state at the optical compensator 120 substantially affects the PMD profile at the optical receiver 130. However, determining a sufficient distance between the optical compensator 120 and the optical receiver 130 can be difficult because the birefringence of different optical conduits can drastically vary from one length of optical conduit to another length of optical conduit and between different segments within a single optical conduit.

If the spatial distribution of an optical fiber's PMD is known, the compensator can be placed such that the ratio of the average PMD, $\Psi_1$, in the conduit 112 between optical source 110 and compensator 120 to the average PMD in the conduit 122 between compensator 120 and optical receiver 130, $\Psi_2$, is approximately $\Psi_1/\Psi_2=0.8$, to provide advantageous performance. Varying this ratio $\Psi_1/\Psi_2$ between 0.5 and 1.2 will yield a similar good performance.

If the spatial distribution of the PMD in the conduit is not known, a uniform distribution can be assumed. In this case, the compensator should be placed such that the ratio of the length of the conduit 112, $L_1$, between optical source 110 and compensator 120 to length of the conduit 122, $L_2$, between compensator 120 and optical receiver 130 is approximately $L_1/L_2=0.65$. Varying this ratio $L_1/L_2$ between approximately 0.25 and 1.5 will yield similar good performance.

The optical compensator 120 receives one or more optical signals from the optical source 110 via conduit 112, rotates the polarization states of the received optical signals, and provides the rotated optical signals to the optical receiver 130 via conduit 122. As discussed above, rotating the polarization states of the optical signals at optical compensator 120 can affect the PMD profile, including first- and higher-order PMD, of the optical signals received by the optical receiver 130.

In various exemplary embodiments, the optical compensator 120 performs a frequency (i.e., wavelength)—independent polarization rotation of all optical signals, a frequency-dependent polarization rotation or any number of known or later developed techniques for rotating a polarization state or otherwise affecting the polarization state of an optical signal.

The optical compensator 120 can also receive commands, error-conditions or other information from the optical receiver 130 via the link 132 and adjust the polarization state of one or more optical signals according to a predetermined scheme. For example, in various exemplary embodiments, the optical compensator 120 can receive an error-condition from the optical receiver 130 using link 132 and adjust the polarization state of one or more optical signals passing through the optical compensator 120 by a predetermined angle. Alternatively, the optical compensator 120 can adjust the polarization states of the optical signals by random or pseudo-random angles, by angles determined by experimental results, by angles determined according to a predetermined formula or parametric model, and the like.

The optical conduits 112 and 122 can be any known or later developed device or system for connecting the optical source 110 to the optical compensator 120 or the optical receiver 130 to the optical compensator 120. Such devices include any number of optical conduits capable of propagating an optical signal such as fiber optic cables including single-mode fiber optic cables and the like. However, it should be appreciated that the optical conduits 112 and 122 alternatively can be any known or later developed optical conduit capable of propagating optical signals from the optical source 110 to the optical compensator 120 or from the optical receiver 130 to the optical compensator 120, respectively.

The link 132 of the exemplary embodiment of the transmission system 100 is an overlaid-operating-system providing feedback from the optical receiver 130 to the optical compensator 120 in less than one second. However, it should be appreciated that the link 132 can be any known or later developed device or system capable of transferring information from the optical receiver 130 to the optical compensator 120, such as a separate fiber optic conduit, a wireless connection, a hardwired connection, and the like. Furthermore, the link 132 can be a separate optical signal transmitted by the optical receiver 130 to the optical compensator 120 using conduit 122.

Figure 2:
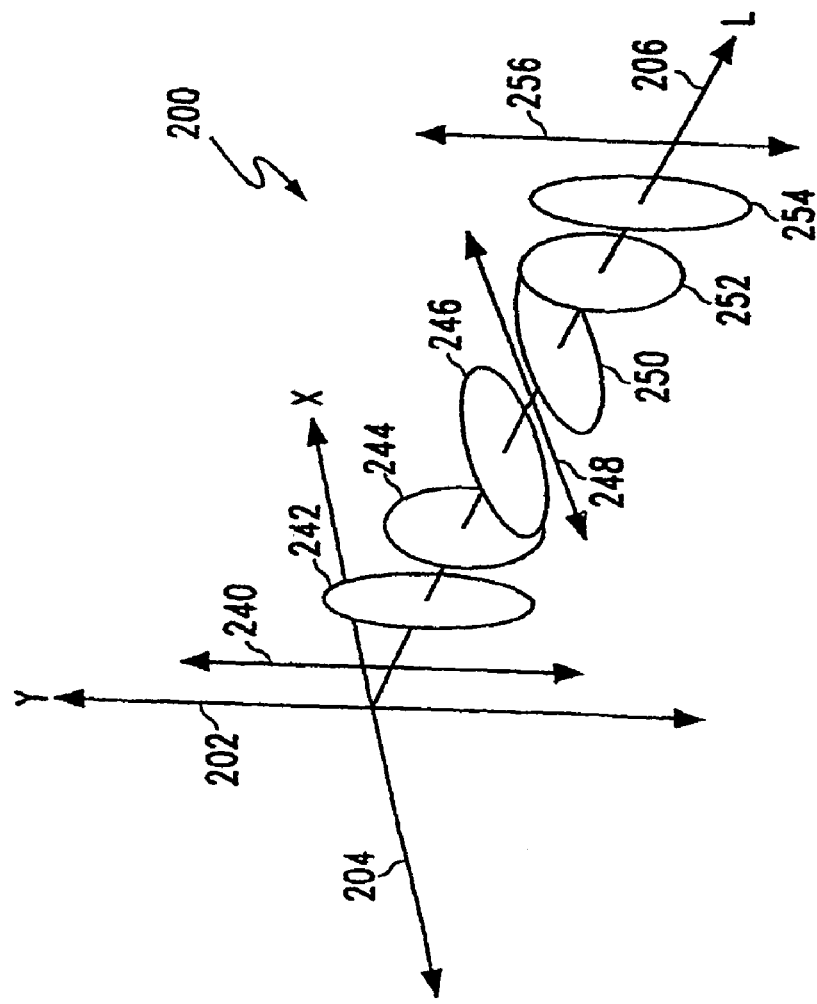

FIG. 2 is an exemplary representation of an elliptical polarized optical signal 200 propagating through an optical conduit along a distance axis 206. The signal 200 has a vertical polarization axis 202 and a horizontal polarization axis 204. As shown in FIG. 2, the polarization phase of the optical signal 200 changes as the optical signal 200 propagates along the distance axis 206.

The exemplary optical signal 200 has a first vertical polarization phase 240. As the optical signal 200 propagates along the distance axis 206, the polarization of the optical signal 200 changes to an elliptical polarization phase 242 with its major axis aligned along the vertical axis 202. As the optical signal 200 further propagates along axis 206, the signal's polarization phase changes to a circular polarization phase 244. Next, the polarization of the optical signal 200 changes to another elliptical phase 246, but with its major axis aligned along the horizontal axis 204. Then, as the optical signal 200 continues to propagate along the distance axis 206, the polarization changes to a purely horizontal phase 248.

As the optical signal 200 continues to propagate along the distance axis 206, the polarization changes again to an elliptical phase 250 with its major axis aligned along the horizontal axis 204, then to a circular polarization phase 252, then again to an elliptical polarization phase 254 with its major axis aligned along the vertical axis 202, then to a purely vertical polarization phase 256. The polarization phase continues to oscillate between phase states in this fashion as it continues to propagate along the distance axis 206.

The rate at which the polarization phase oscillates, or precession rate, varies as a function of a variety of factors, including the frequency of an optical signal. Generally, the shorter the wavelength of light, the greater the precession rate. For an optical signal having a variety of frequency components propagating along an optical conduit, the precession rate for each frequency can vary and thus the instantaneous polarization phase of the different frequencies can differ at any point along the conduit.

Figure 3:
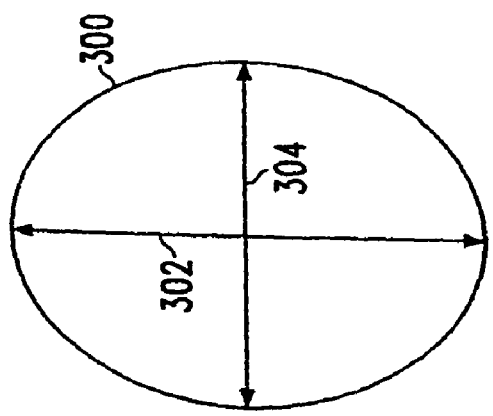

FIG. 3 shows a cross section of a non-circular optical conduit 300 capable of propagating an optical signal. The exemplary optical conduit 300 has a fast-axis 302 and a slow-axis 304 that are orthogonal to the direction of propagation of the optical signal. The two axes 302 and 304 define a principle plane having the property that light of a given wavelength will propagate faster as its polarization mode aligns with the fast-axis 302, and will propagate slower as the polarization mode aligns with the slow-axis 304. For light propagating with any state of polarization other than purely along the fast or slow-axis 302 or 304, the light is resolved into its principal plane components. Because the optical components aligned with the fast-axis 302 travel faster than the components traveling along the slow-axis 304, an optical signal with components resolved along both axis 302 and 304 can be dispersed over time, thus causing PMD.

As a practical matter, it is difficult to make an optical conduit 300 that does not cause PMD because optical conduits are rarely perfectly manufactured. If a defect of the optical conduit 300 is constant throughout the length of the conduit, then the resulting PMD is generally limited to first-order PMD. However, if the dimensions of the optical conduit 300 vary along the length of the optical conduit 300, the birefringence of the optical conduit 300 at any point can vary accordingly. As discussed above, the precession rate for different frequencies of light in an optical signal can vary as a frequency of light and thus each optical frequency can have a different polarization phase at any point. Therefore, as a multi-frequency light signal propagates along an optical conduit with varying birefringent properties, each optical frequency can have different proportions of fast and slow components at any point along the optical conduit and thus dispersion can vary as a function of optical frequency.

Furthermore, as environmental factors such as temperature, humidity and even gravity vary over the course of time, deformations along the optical conduit 300 can appear, disappear or change at any point along the optical conduit 300, thus changing the PMD profiles of the various optical signals traversing the optical conduit 300.

Figure 4:
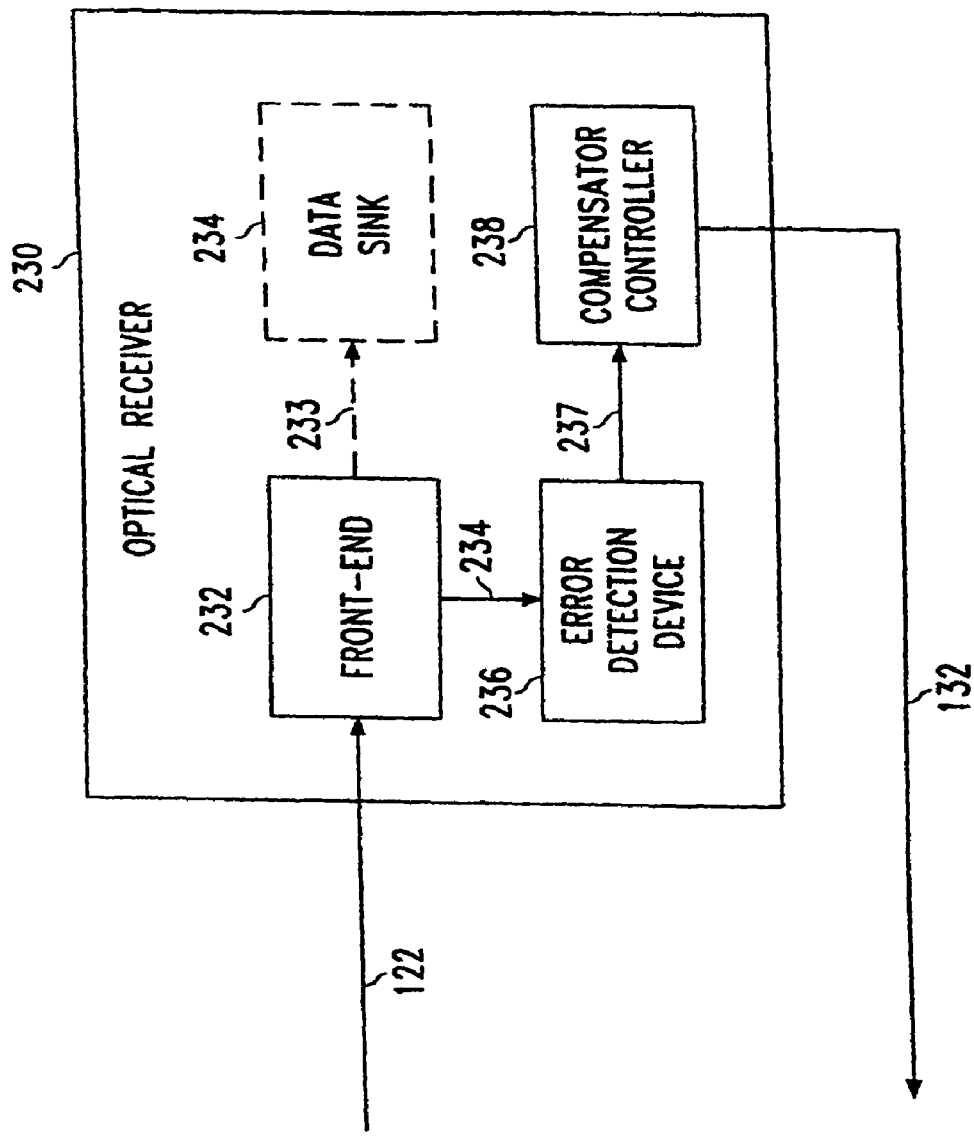

FIG. 4 is a block diagram of an exemplary optical receiver 230 that can receive one or more optical signals having PMD, detect an error condition in the received optical signals and generate a control signal based on the error condition. The optical receiver 230 has a front-end 232, a data sink 234, an error detecting device 236 and a compensator controller 238.

The front-end 232 receives one or more optical signals from conduit 122 and converts the optical signals to baseband electrical signals. While the exemplary front-end 232 consists of various optical filters/splitters, optical transducers, amplifiers and other electronics, it should be appreciated that the front-end 232 can be any combination of known or later developed components capable of receiving one or more optical signals and converting the optical signals to electrical signals. It should be further appreciated that, in various exemplary embodiments, the front-end 232 can also provide PMD compensation independent from that provided by external devices using any known or later developed PMD compensation technique. As the front-end 232 converts optical signals to electrical signals, the electrical signals are provided to the data sink 234 via link 233 and to the error detection device 236 via link 235.

The data sink 234 of the exemplary embodiment receives electrical signals from the front-end 232 using link 233 and distributes the electrical signals to various terminals (not shown). However, it should be appreciated that the data sink 234 can alternatively be any known or later developed device capable of receiving, storing, routing or sensing electrical signals.

In various exemplary embodiments, the error detection device 236 receives electrical signals from the front-end 232 via link 235, determines the number of bit-errors present according to the SONET standard for B1-register errors, for example, and reports the number of bit-errors to the compensator controller 238 using link 237.

However, the error detection device 236 can alternatively measure bit-errors, bit error rates or other error conditions using an FEC technique or any other known or later developed technique that can determine error conditions. In other exemplary embodiments, the front-end 232 and error detection device 236 can directly or indirectly measure PMD and report the results to the compensator controller 238.

The compensation controller 238 receives the error conditions, PMD information or other performance criteria, determines whether the PMD of a particular optical signal is excessive based on the received information and acts accordingly. For example, in an optical communication system having a single optical conduit carrying multiple optical signals, if error detection device 236 measures a bit-error rate of two bit-errors per hour in a given received optical signal, the compensation controller 238 can take a first decision not to issue a PMD compensation command. However, if the particular bit-error rate increases to 300 bit-errors per second or if the optical signal appears to fail completely, the compensation controller 238 can issue a PMD compensation command to one or more optical compensators to adjust for the excessive PMD.

While in various embodiments, the exemplary compensator controller 238 resides in the optical receiver 230, it should be appreciated that the compensator controller 238 can optionally reside in one or more optical compensators or in a third device such as a central controller, a network server and the like.

Figure 5:
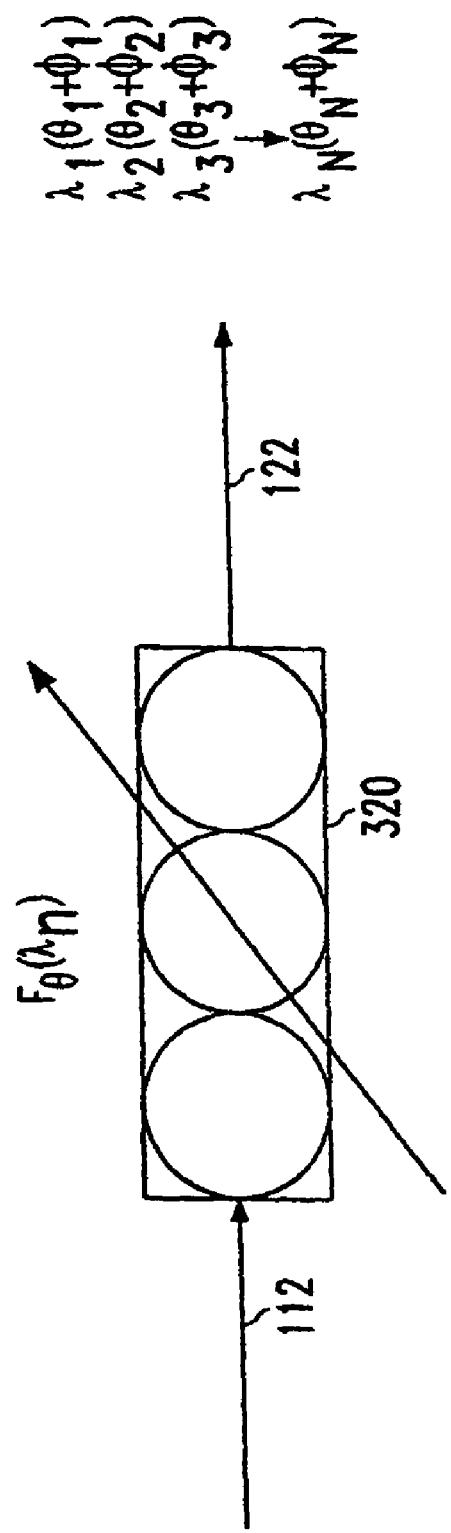

FIG. 5 is a first exemplary optical compensator 320 of the communication system 100 of FIG. 1. In various exemplary embodiments, the first optical compensator 320 can be one or more optical polarization controllers such as a number of fiber squeezers, a combination of λ/2 and λ/4 optical delay components, optical fiber loop based Lefevre polarization controllers, Faraday rotators, Babinet-Soleil compensators, a rotation of two-lensed or bare-fiber ends, or any other known or later developed device that can perform a polarization phase rotation or otherwise affect the state of a polarization state of an optical signal. However, for the discussion below, first optical compensator 320 is a Lefevre polarization controller.

In operation, first optical compensator 320 receives one or more optical signals $[\lambda_1(\theta_1), \lambda_2(\theta_2), \lambda_3(\theta_3) \ldots \lambda_N(\theta_N)]$ via optical conduit 112, rotates the polarization state of the received optical signals and provides the rotated optical signals $[\lambda_1(\theta_1+\phi_1), \lambda_2(\theta_2+\phi_2), \lambda_3(\theta_3+\phi_3) \ldots \lambda_N(\theta_N+\phi_N)]$ to optical conduit 122. At any time during operation, the first optical compensator 320 can be controlled by commands received over link 132 to change the angle of polarization rotation performed on the optical signals.

In various exemplary embodiments, PMD compensation can be performed with a single polarization rotator that can perform an approximately 90 degree rotation around a predetermined axis, pertaining to the polarization representation on the Poincare Sphere. In other exemplary embodiments, two concatenated polarization rotators capable of rotating a polarization state by 90 degrees around two fixed, orthogonal axes can be used. If the rotation around the first axis using the first polarization rotator does not improve the signal, the second polarization rotator can be activated to additionally/alteratively rotate the polarization around the second axis. While the exemplary technique uses one or two polarization rotation devices that can orthogonally rotate the polarization state of an optical signal, it should be appreciated that any number of polarization rotators directed to orthogonal and non-orthogonal rotations can be used without departing from the spirit and scope of the invention.

While a compensation command issued to the optical compensator 320 directed to a particular optical signal can correct for excessive PMD in that optical signal, it should be appreciated that the PMD for all other optical signals simultaneously passing through the optical compensator 120 and received by an optical receiver can consequentially worsen as a result of the polarization state change. However, experiments reveal that, while the PMD of the various other optical signals can improve or worsen for a particular polarization state change, rarely will a command directed to correct PMD of a first optical signal cause the PMD of the other optical signals to increase to unacceptable levels. In any event, if one or more other optical signals are disabled due to a first compensation command, subsequent commands directed to compensating for the other optical signals subsequently plagued with excessive PMD can be issued until all optical signals are operative. While there is no guarantee that all optical signals can be manipulated by one or more optical compensators until all the optical signals are operational, experimental results suggest that the likelihood of simultaneous operation of all optical signals is still highly likely.

Figure 6:
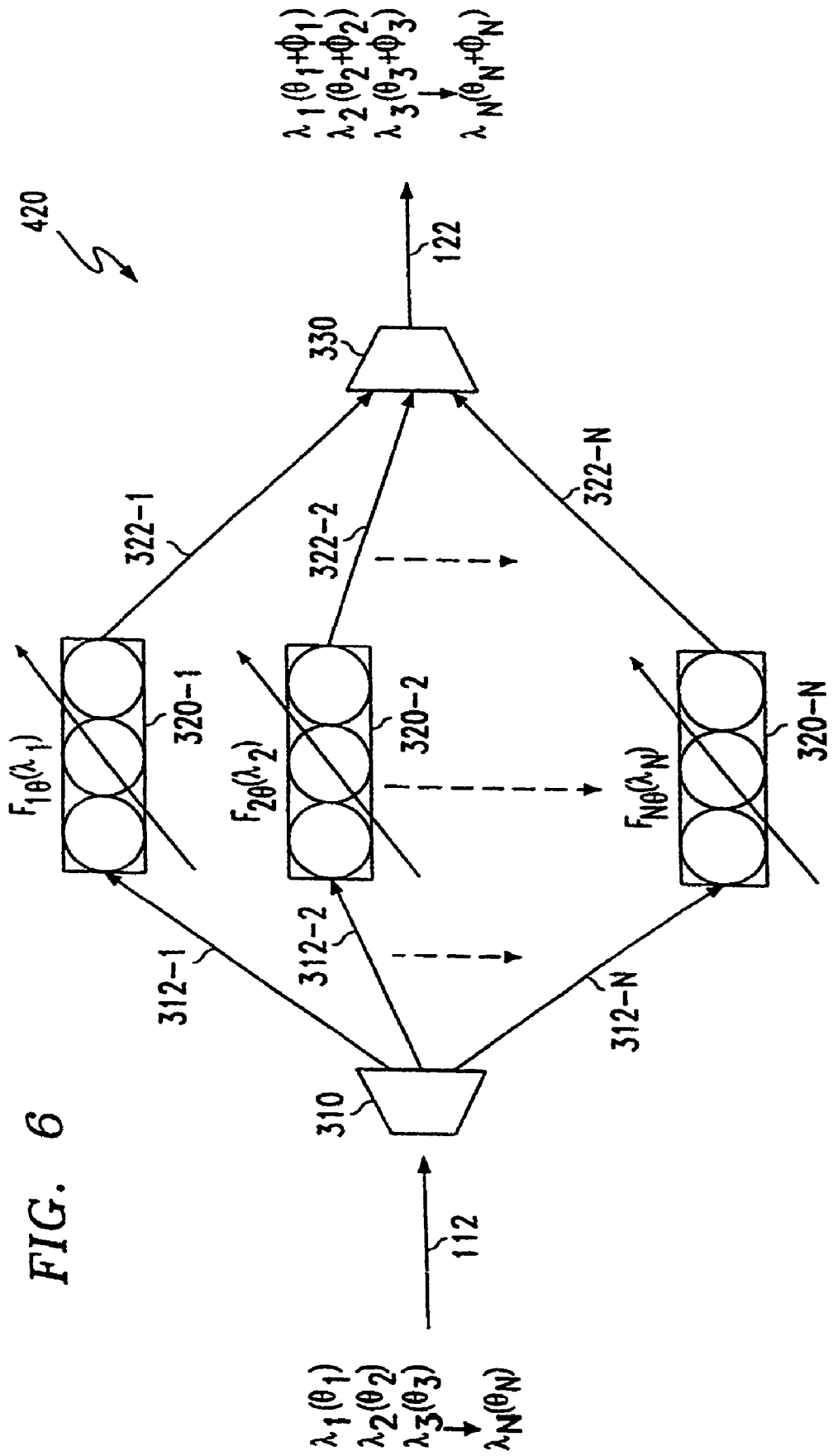

FIG. 6 is a second exemplary optical compensator 420 of the communication system 100 of FIG. 1. The second optical compensator 420 includes an optical splitter 310, a number of optical polarization controllers 320-1, 320-2 . . . 320-N and an optical combiner 330.

The optical splitter 310 receives one or more optical signals $(\lambda_1, \lambda_2, \lambda_3, \ldots \lambda_N)$ via optical conduit 112 and redirects individual optical signals or groups of optical signals to the optical polarization controllers 320-1, 320-2 . . . 320-N via conduits 312-1, 312-2 . . . 312-N. In various exemplary embodiments, the optical splitter 310 can be an Arrayed Waveguide Grating (AWG), a combination of Fiber Bragg Gratings, a combination of an optical power splitter and a narrow-band optical filter, or a cascade of channel interleavers, e.g., in a Mach-Zehnder structure. However, the optical splitter 310 alternatively can be any known or later developed device capable of receiving two or more optical signals and redirecting individual optical signals or groups of signals to the optical polarization controllers 320-1, 320-2 . . . 320-N.

The optical polarization controllers 320-1, 320-2 . . . 320-N each receive one or more optical signals, rotate the polarization state of the optical signals and provide the rotated optical signals to the optical combiner 330. As discussed above, in various exemplary embodiments, the optical polarization controllers 320-1, 320-2 . . . 320-N can be one or more optical polarization controllers such as fiber squeezers, a combination of $\lambda/2$ and $\lambda/4$ optical delay components, optical fiber loop based Lefevre polarization controllers, a Faraday rotators, Babinet-Soleil compensators, a rotation of two-lensed or bare-fiber ends, or any other known or later developed device that can perform a polarization phase rotation or otherwise affect the state of a polarization state of an optical signal.

Additionally, as with the first optical controller 320 of FIG. 5, each optical polarization controller 320-1, 320-2 . . . 320-N can be individually controlled by various commands to change the degree of polarization rotation performed on the optical signals.

The optical combiner 330 receives the rotated optical signals from the optical polarization controllers 320-1, 320-2 . . . 320-N via conduits 322-1, 322-2 . . . 322-N, combines the rotated optical signals and provides the combined signals to optical conduit 122. In various exemplary embodiments, the optical combiner 330 can be an Arrayed Waveguide Grating (AWG), a combination of Fiber Bragg Gratings, an optical power combiner, or a cascade of channel interleavers, e.g., in a Mach-Zehnder structure. However, the optical combiner 330 alternatively can be any known or later developed device capable of receiving one or more rotated optical signals via conduits 322-1, 322-2 . . . 322-N, combine the rotated signals and provide the combined optical signals to conduit 122.

Figure 7:
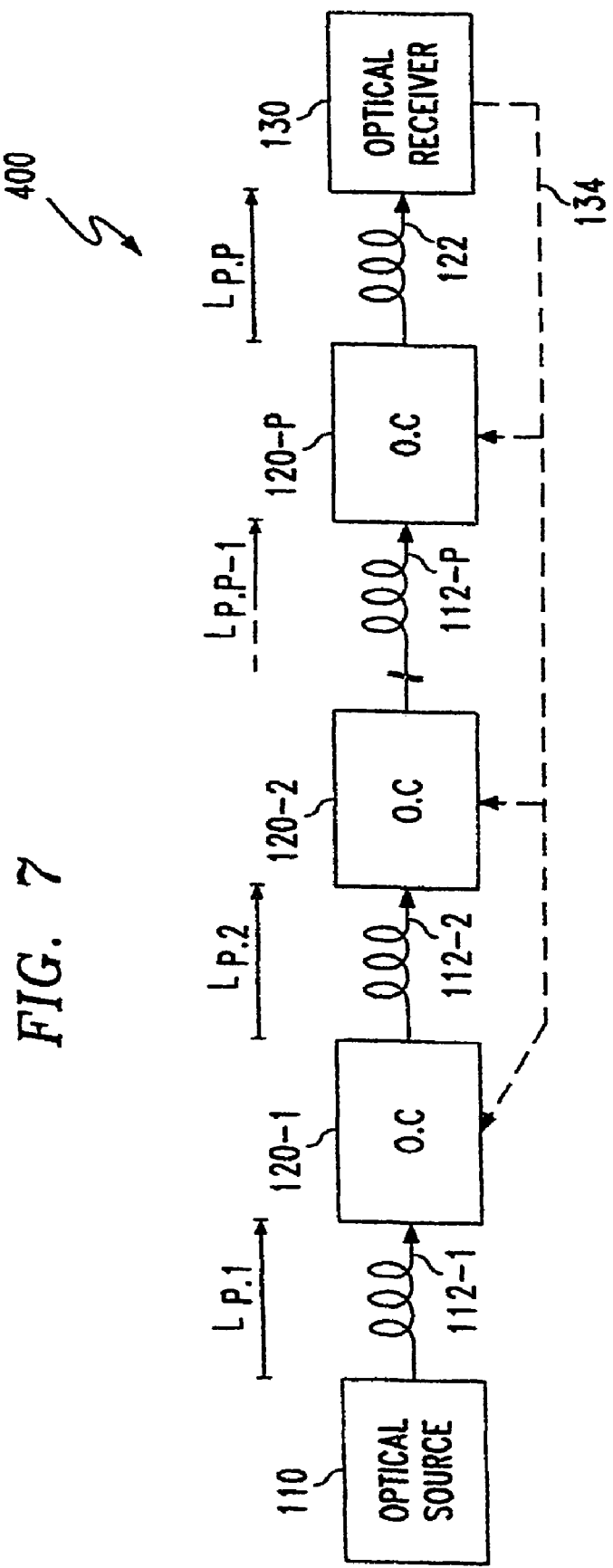

FIG. 7 shows an exemplary block diagram of a second optical transmission system 400. The system 400 includes an optical source 110, a number of optical compensators 120-1, 120-2 . . . 120-P and an optical receiver 130. In operation, the first optical compensator 120-1 receives optical signals from the optical source 110 via conduit 112-1, rotates the polarization states of one or more of the optical signals, then provides the rotated optical signals to the next optical compensator 120-2, and so on, until the optical signals have passed through all optical compensators 120-1, 120-2 . . . 120-P and are received by the optical receiver 130. As with the first transmission system 100 shown in FIG. 1, the optical receiver 130 can also send commands, error conditions or other information to the optical compensators 120-1, 120-2 . . . 120-N using the link 134 to change the polarization states of the optical signals, thus adjusting for PMD.

As with the first transmission system 100 shown in FIG. 1, the exact placement of the optical compensators 120-1, 120-2 . . . 120-P can vary with the birefringence of the various optical conduits 112-1, 112-2 . . . 112-P and 122. However, it should be appreciated that, assuming the birefringent nature of the optical conduits is relatively constant, the optical compensators 120-1, 120-2 . . . 120-P can be positioned at substantially equal intervals between the optical source 110 and the optical receiver 130. Furthermore, it should be appreciated that it can be advantageous to add one more optical compensator at the optical source 110.

Figure 8:
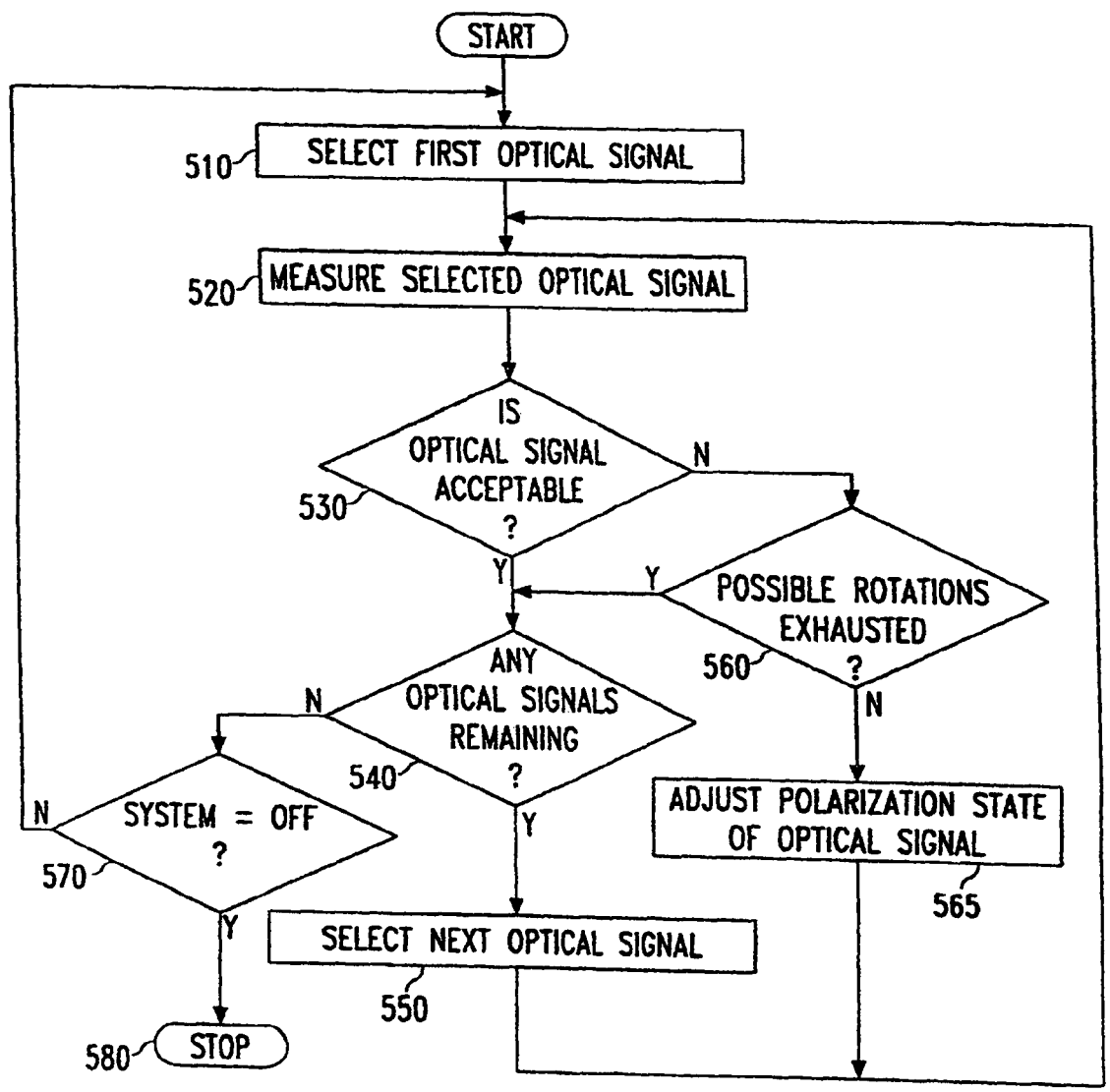

FIG. 8 is a flowchart outlining an exemplary method for compensating optical signals having first- and higher-order PMD. The operation starts in step 510 where a first optical signal is selected from a predetermined set of optical signals received by an optical receiver through a common optical conduit. Next, in step 520, the selected optical signal is measured for an error condition. While the exemplary technique measures the number of bit-errors received by an optical receiver, as discussed above, any known or later developed technique directed to measuring various error conditions of the optical signal, or measuring the PMD of the optical signal can alternatively be used. Control continues to step 530.

In step 530, a determination is made as to whether the selected optical signal is acceptable. If the selected optical signal is acceptable, control continues to step 540; otherwise, control jumps to step 560. While the exemplary technique determines whether the selected optical signal is acceptable according to a range of acceptable bit-error rates, it should be appreciated that any decision criteria directed to making decisions to adjust PMD based on an error condition or received levels of PMD can alternatively be used.

In step 560, because the selected optical signal is not acceptable, a determination is made as to whether all available rotation states of all applicable compensation devices that can possibly correct for PMD of the selected signal have been exhausted without success. If all of the available polarization states are exhausted, control jumps to step 540; otherwise, control continues to step 565.

In step 565, the polarization state of the selected optical signal is altered by an optical compensator located upstream from the optical receiver. While the exemplary technique changes the polarization state of the selected optical signal by increments of 90° along one or more orthogonal axis, it should be appreciated that any known or later developed scheme directed to adjusting the polarization state of an optical signal at an optical compensator to change a PMD profile at a receiver alternatively can be used. Control then jumps back to step 520, where the selected optical signal is again measured.

In step 540, because the selected optical signal is acceptable, a determination is made as to whether any of the optical signals from the predetermined set of optical signals remain to be selected and determined as acceptable. If any optical signals remain to be selected and tested, control continues to step 550; otherwise, control jumps to step 570.

In step 550, a next optical signal of the set of optical signals is selected and control jumps back to step 520 where the next selected optical signal is measured.

In step 570, because all of the available signals have been measured, a determination is made to turn off the system. If the system is to be turned off, control continues to step 580 where the process stops; otherwise, control jumps back to step 510 where the first optical signal of the set of optical signals is again selected.

In the exemplary embodiment shown in FIG. 4, the optical receiver 230 is implemented on a programmed general purpose computer equipped with a high-speed optical front-end 232. However, the optical receiver 230 can also be implemented on a special purpose computer, a programmed microprocessor or microcontroller and peripheral integrated circuit elements, an ASIC or other integrated circuit, a digital signal processor, a hardwire electronic or logic circuit such as discrete element circuit, a programmable logic device such as PLD, PLA, FPGA or PAL, or the like. In general, any device capable of implementing a finite state machine that is in turn capable of implementing the digital processing system of FIG. 4 or the flowchart of FIG. 8 can be used to implement the optical receiver 230.

It should be understood that each of the circuits shown in FIG. 4 can be implemented as portions of a suitably programmed general personal computer. Alternatively, each of the circuits shown in FIG. 4 can be implemented as physically distinct hardware circuits within an ASIC, or using a FPGA, a PLD, a PLA or a PAL, or using discrete logic elements or discrete circuit elements. The particular form each of the circuits shown in FIG. 4 will take is a design choice and will be obvious and predictable to those skilled in the art.

It should be similarly understood that each of the optical components and circuits shown in FIGS. 4-6 can be implemented as distinct optical devices. Alternatively, each of the optical components and circuits shown in FIGS. 4-6 can be implemented as physically indistinct or shared hardware or combined with other optical components and circuits otherwise not related to the devices of FIGS. 4-6 and the flowchart of FIG. 8. The particular form each of the optical components and circuits shown in FIGS. 4-6 will take is a design choice and will be obvious and predictable to those skilled in the art.

While this invention has been described in conjunction with the specific embodiments thereof, it is evident that many alternatives, modifications, and variations will be apparent to those skilled in the art. Accordingly, the embodiments of the invention as set forth herein are intended to be illustrated and not limiting. Thus, there are changes that may be made without departing from the spirit and scope of the invention.

What is claimed is:

1. An optical communication system that compensates for polarization mode dispersion, comprising;
    an optical source that transmits a plurality of optical signals having different optical frequency bands;
    a first optical compensator that receives the plurality of optical signals and rotates a polarization state of the plurality of optical signals to produce a plurality of rotated optical signals;
    a first birefringent optical conduit that receives the plurality of rotated optical signals from the first optical compensator and disperses the plurality of rotated optical signals to produce a plurality of dispersed optical signals; and
    an optical receiver that receives the plurality of dispersed optical signals from the first birefringent optical conduit, wherein the optical receiver measures an error condition of a first dispersed optical signal of the plurality of dispersed optical signals;
    wherein the first optical compensator rotates the polarization state of the plurality of optical signals based on the error condition of the first dispersed optical signal to compensate for polarization mode dispersion, the first optical compensator positioned at a location between the optical source and the optical receiver and defined by a ratio $L_1/L_2$;
    wherein $L_1/L_2$ is less than approximately 1.5, and wherein $L_1$ is a first length of a second birefringent optical conduit between the first optical compensator and the optical source, and $L_2$ is a second length of the first birefringent optical conduit between the first optical compensator and the optical receiver.

2. The optical communication system of claim 1, wherein $L_1/L_2$ is approximately $1.5 \geq (L_1/L_2) \geq 0.25$.

3. The optical communication system of claim 2, wherein the ratio $L_1/L_2$ is approximately 0.65.

4. An optical communication system that compensates for polarization mode dispersion comprising:
    an optical source that transmits a plurality of optical signals having different optical frequency bands;
    a first optical compensator that receives the plurality of optical signals and rotates a polarization state of the plurality of optical signals to produce a plurality of rotated optical signals;
    a first birefringent optical conduit that receives the plurality of rotated optical signals from the first optical compensator and disperses the plurality of rotated optical signals to produce a plurality of dispersed optical signals;
    a second optical compensator that receives the plurality of dispersed signals from the first birefringent optical conduit and rotates a polarization state of the plurality of dispersed optical signals to produce a plurality of second rotated optical signals;
    a second birefringent optical conduit that receives the plurality of second rotated optical signals and disperses the plurality of second rotated optical signals to produce a plurality of second dispersed optical signals; and
    an optical receiver that receives the plurality of second dispersed optical signals from the second birefringent optical conduit, wherein the optical receiver measures an error condition of a first dispersed optical signal of the plurality of second dispersed optical signals;
    wherein the first optical compensator rotates the polarization state of the plurality of optical signals based on the error condition of the first dispersed optical signal to compensate for polarization mode dispersion and the second optical compensator rotates the plurality of dispersed optical signals based on the error condition of the first dispersed optical signal to compensate for polarization mode dispersion, the first optical compensator positioned at a location between the optical source and the optical receiver and defined by a ratio $L_1/L_2$;
    wherein $L_1$ is a first length of a third birefringent optical conduit between the first optical compensator and the optical source, and $L_2$ is a second length of the second birefringent optical conduit between the second optical compensator and the optical receiver.

5. The method of claim 4, wherein $L_1/L_2$ is approximately $1.5 \geq (L_1/L_2) \geq 0.25$.

6. The method of claim 5 wherein the ratio $L_1/L_2$ is approximately 0.65.

7. A method for compensating for polarization mode dispersion comprising;
    measuring an error condition at an optical receiver;
    rotating, at an optical compensator, the polarization states of a plurality of optical signals based on the error condition of the plurality of optical signals at an optical compensator to produce a plurality of rotated optical signals;
    dispersing the plurality of rotated optical signals from the optical compensator using a first birefringent optical conduit to compensate for polarization mode dispersion to produce a plurality of dispersed optical signals; and
    receiving the plurality of dispersed optical signals from the first birefringent optical conduit at an optical receiver;
    wherein the step of rotating occurs at a location between an optical source and the optical receiver defined by a ratio $\psi_1/\psi_2$ and $\psi_1/\psi_2$ is less than approximately 1.2, and $\psi_1$ is an average polarization mode dispersion of a first optical conduit between the optical compensator and optical source, and $\psi_2$ is an average polarization mode dispersion of a second optical conduit between the optical compensator and optical receiver.

8. The method of claim 7, wherein $\psi_1/\psi_2$ is approximately $1.2 \geq \psi_1/\psi_2 \geq 0.5$.

9. The method of claim 8, wherein $\psi_1/\psi_2$ is approximately 0.8.

* * * * *